United States Patent Office 3,445,770
Patented May 20, 1969

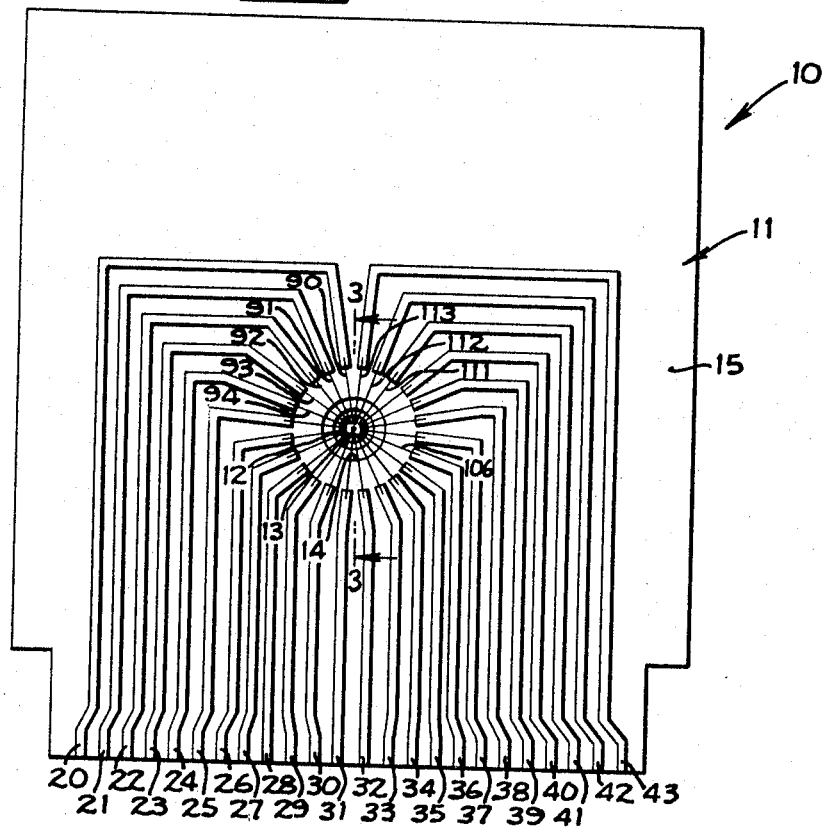

3,445,770
MICROELECTRONIC TEST PROBE WITH DEFECT MARKER ACCESS
Richard C. Harmon, Campbell, Calif., assignor, by mesne assignments, to Philco-Ford Corporation, a corporation of Delaware
Filed Dec. 27, 1965, Ser. No. 516,560
Int. Cl. H02b; G01r 1/20
U.S. Cl. 324—158    1 Claim

ABSTRACT OF THE DISCLOSURE

A microelectronic probe board comprises a base portion provided with an opening. Each of a plurality of conductor probes has its free end projecting into the opening. An electrically insulative sheet is supported by the base and extends over the opening. The insulative sheet includes a plurality of openings through which the free ends of the probes extend. A plurality of electrically conductive strips are affixed to surface portions of the base, and are electrically connected to the probes.

The present invention relates in general to electronic testing apparatus, and more particularly to a microelectronic probe board and method for making same.

An object of the present invention is to provide a probe board for semiconductor devices that enables the electrical functions of a semiconductor device with a large number of leads to be tested.

Another object of the present invention is to facilitate the testing of the electrical functions of a semi-conductor device.

Another object of the present invention is to provide a method for making a microelectronic probe board.

Another object of the present invention is to facilitate the marking on semiconductor devices to distinguish rejects from acceptable devices.

Another object of the present invention is to provide a probe board for testing the electrical functions of a semiconductor device without tending to mar or damage the surface of the semiconductor device.

Other and further objects and advantages of the present invention will be apparent to one skilled in the art from the following description taken in conjunction with the accompanying drawings, in which:

FIG. 1 is a plan view of the microelectronic probe board of the present invention.

FIG. 2 is a fragmentary, enlarged bottom view of the probe board shown in FIG. 1.

FIG. 3 is a vertical sectional view taken along line 3—3 of FIG. 1.

Illustrated in FIGS. 1–3 is the probe board 10 of the present invention, which is employed for testing the electrical functions or for die sorts of a microelectronic semiconductor device or wafer.

The probe board 10 comprises a suitable rigid, flat base 11 of insulating material, which may conveniently be a printed circuit board. Formed in the board 11 is a bore 12. Concentric with the bore 12 is an increased diameter bore 13. Similarly, an increased diameter bore 14 is formed in the base 11 concentric with the bores 12 and 13.

Fixed to a flat surface 15 of the base 11 are a plurality of spaced conductor strips 20–43. In the exemplary embodiment, there are twenty-four conductor strips made of suitable material, such as copper. As shown in FIG. 1, the conductor strips 20–43 at the free ends thereof terminate in spaced transverse alignment parallel to an edge of the base 11. At the opposite ends thereof, the conductor strips 20–43 terminate in spaced relationship to define a circular area concentric with the bores 12–14 and such opposite ends being angularly spaced about the periphery of the circular area and being radially directed relative to the circular area and the bores 12–14.

On a surface 49 of the base 11, which is oppositely directed from the surface 15, is fixedly secured a sheet 50 of suitable transparent, rigid, insulating plastic, such as Mylar. The insulating sheet 50 is fixedly secured to the surface 49 of the base 11 by suitable means, such as doubled backed tape. The insulating sheet 50 covers the opening formed by the bore 12 and extends therebeyond along the surface 49 so as to cover an area in excess of the area of the bore 14. Formed in the sheet 50 is an opening 51 that is located at the axis of the bores 12–14. Also, formed in the plastic sheet 50 is a plurality of openings 60–83, which define substantially a rectangular configuration within the bore 12. In practice, it has been found that the opening 51 should be as large an area as possible. Therefore, the opening 51 can be made larger and to conform to the configuration of the area defined by the openings 61–83, but, however, smaller in area. It has been found that a rectangular configuration for the opening 51 is desirable to afford an inking access. The narrow bore 12 serves to afford greater durability to the insulating sheet 50 than would be possible with a larger opening.

Connected to the ends of the conductor strips 20–43 that are directed radially toward the bores 12–14 are probes 90–113, respectively. Suitable means, such as solder, fixedly secure the ends of the probes 90–113 to the ends of the conductor strips 20–43, respectively. The probes 90–113 are made of suitable conducting material, such as tungsten, and are directed radially relative to the bores 12–14. As shown in FIGS. 1 and 3, the probes 90–113 upon reaching the bore 13 are directed downwardly and the free ends are further directed downwardly into the bore 12 and then are freely received by the openings 60–83, respectively, of the insulating sheet 50. The free ends of the probes 90–113 project out of the insulating sheet 50 a distance between .050–.100 of an inch and are disposed at right angles to the insulating sheet 50 and the base 11. The configuration of the probes 90–113 and the guidance of the insulating sheet 50 minimize any tendency for the probes to slide toward the center of the wafer or device under test.

In the use of the brobe board 10, a semiconductor device or walfer is held in a jig or other suitable retaining assemble. The probe board 10 with the surface 15 of the base 11 facing upwardly is placed above the semiconductor device or wafer to be tested. Now, the probe board 10 is lowered so that the free ends of the probes 90–113 contact the wafer or semiconductor device to be tested with the free ends of the probes accurately aligned with the metal bonding pads formed on the semiconductor device or wafer. In so doing, the surface 49 of the base 11 is contiguous with the exposed or upper surface of the semiconductor device or wafer to be tested. This procedure obviates the tendency to mar the surface of the semiconductor device or wafer. With the free ends of the probes 90–113 being respectively freely movable and the ends thereof being sanded to even height or equal projecting lengths there is uniform contact between each probe and its associated pad. Now, conventional testing equipment or die sort testing apparatus is connected to the transversely aligned, terminaal end of the conductor strips 22–43 and the electrical functions or characteristics of the microelectronic semiconductor device or wafer is thereupon determined.

From the foregoing, it is to be observed that the conductor probes 90–113 provide the contact with the semiconductor device or wafer to conduct the test. The insulting sheet 50, preferably of Mylar, serves as the insulator and guide for the probes 90–113. It is the base 11, preferably a printed circuit board, that retains the probes 90–113 and the insulating sheet 50 in fixed relative positions for testing.

Should a semiconductor device be rejected, an ink mark is placed on the upper surface of the rejected semiconductor device. In practice, the mark or inking dot has an area of .015 of an inch. It has been found that the wafer or semiconductor device could be inked or marked by employing a hypodermic needle with a flat end. A solid tungsten wire of preferably .005 of an inch is inserted into the needle end of the hypodermic needle. The reservoir of the hypodermic needle is filled with food coloring. By holding the hypodermic needle stationary and by lowering the tungsten wire until its lower end contacts the semiconductor device, a suitable marker or dot is formed on the semiconductor device.

In the method of producing the microelectronic test probe board 10, a contact print pattern of the pad mask of the wafer is selected. Thereupon, the contact print pattern is placed on a supporting surface emulsion side down and double backed adhesive tapes are extended across the exposed face of the contact print pattern. Now, the insulating sheet 50 is caused to adhere to the contact print pattern through the adhesive tapes with the opening 51 of the sheet 50 carefully aligned relative to the contact print pattern. For exemplary embodiment, the insulating sheet 50 is one inch square.

Thereupon, double backed adhesive tapes are extended across the insulating sheet 50 over the opening 51. The assembled sheet 50 and contact print pattern through the adhesive tapes are caused to adhere to a Teflon block. The Teflon block is secured to a drill press and the insulating sheet 50 adheres to the Teflon block with the contact print pattern adhering to the insulating sheet 50. A drill is aligned over the contact print pattern with the aid of microscope and the holes 60–83 are drilled in the insulating sheet 50. The hole 51 is formed in the insulating sheet 50 by drill end milling. Now, the insulating sheet 50 is prepared for permanent attachment to the surface 49 of the rigid base 11 after the contact print pattern is detached from the insulating sheet 50.

At this time, the base 11 is selected from a printed circuit board with the copper conductor strips 20–43 fixed to the circuit surface of the base 11. The bores 12–14 are formed in the base 11 in a conventional manner from the circuit side of the printed circuit board. Then, the base 11 is placed on a bench with the circuit side of the base 11 engaging or resting upon the bench. Double backed adhesive tape is placed on the surface 49 of the base 11 over the bore 12 to cover the opening. The tape covering the bore 12 is removed by a suitable knife. Then the insulating sheet 50 is oriented over the bore 12 and pressed against the surface of the board 11 to be fixed thereto. The excess adhesive tape is then trimmed and removed from the board 11 and the insulating sheet 50. This arrangement serves to reduce any sag in the insulating sheet and to strengthen the insulating sheet.

The brobes 90–113 are now formed. Toward this end, tungsten wires of a diameter, such as .010 of an inch, are cut to predetermined uniform lengths by suitable means, such as metal shears. The tungsten wires at the ends thereof to be soldered to the conductor strips 20–43 are copper plated and then gold plated for facilitating the soldering operation. Conventional copper and gold plating procedures may be employed.

The ends of the probes 90–113 opposite from the ends thereof to be soldered to the conductor strips 20–43 are bent at the free tips thereof approximately ninety degrees relative to the respective shanks thereof. This can be accomplished by a machine shop bender or tweezers. By a suitable etching process, the probes 90–113 can be etched to substantially a prescribed dimension for reducing gradually the diameter of the free ends of the probes 90–113. The probes are checked under a microscope for consistent bending angles and alignment. Corrections can be made by the use of a tweezer.

One suitable etching procedure would be to have the tungsten wires held in an etching solution of sodium hydroxide and distilled water by a suitable holder. A copper coil is disposed in the etching solution. A power supply has its positive terminal connected to the copper coil and its negative terminal connected to the tungsten wires. While the tungsten wires are immersed in the etching solution, they are moved vigorously in a circular motion until etched to the described dimension.

The probes 90–113 of tungsten wires are now inserted downwardly into the openings 60–83, respectively, for free movement with the surface 15 of the base 11 facing upwardly. The ninety degree bent ends of the probes 90–113 project slightly out of the openings 60–83 of the insulating sheet 50 and the opposite ends thereof are soldered to the conductor strips 20–43, respectively. The contact print is not placed on the microscope table and the probes 90–113 are aligned over the contact print. Suitable adjustments are made. The base 11 is placed with its surface 49 against an abrasive, such as fine sandpaper, and the probes 90–113 are sanded until flat and level. From the foregoing, it is to be observed that the probes 90–113 could be individually replaced without disassembling the probe board 10. The sanding of the probe tips improve the contact with the semiconductor device or a wafer under test.

Having thus described my invention, what I claim as new and desire to protect by Letters Patent is:

1. A microelectronic probe board comprising: an electrically insulative, substantially planar base having an opening extending therethrough, said opening including a generally counter-sunk portion presenting a stepped surface substantially parallel to one side of said base; a plurality of electrically conductive probes having fixed ends extending over said one side of said base and free ends thereof projecting into said opening and extending beyond the opposite side of said base, said probes including portions intermediate their ends that extend across and in contacting relation with said stepped surface; an electrically insulative sheet extending over said opening and supported on the recited other side of said base, said sheet having a plurality of apertures through which said free ends of said probes extend, said apertures being arranged in a geometric array substantially coaxial with said opening in said board, and a freely accessive indexing opening aligned with said opening in said base and disposed in generally central relationship to said array; and a plurality of electrically conductive strips carried by said one side of said base and each electrically connected to a corresponding one of the fixed ends of said probes.

References Cited

UNITED STATES PATENTS

| | | | |
|---|---|---|---|
| 3,134,942 | 5/1964 | Rhodes | 324—158 XR |
| 3,293,544 | 12/1966 | Seng | 324—38 |
| 3,319,166 | 5/1967 | Coleman | 324—158 |
| 3,345,567 | 10/1967 | Turner | 324—158 |

OTHER REFERENCES

IBM Technical Disclosure Bulletin, vol. 5, #10, March 1963, pp. 33–34.

RUDOLPH V. ROLINEC, *Primary Examiner.*

E. L. STOLARUN, *Assistant Examiner.*

U.S. Cl. X.R.

317—101; 324—72.5; 339—17

PO-1050
(5/69)

UNITED STATES PATENT OFFICE
CERTIFICATE OF CORRECTION

Patent No. 3,445,770            Dated May 20, 1969

Inventor(s) Richard C. Harmon

It is certified that error appears in the above-identified patent and that said Letters Patent are hereby corrected as shown below:

Column 2, line 64, "terminaal" should read

-- terminal --.

Column 4, line 49, "accessive" should read

-- accessible --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents